March 7, 1933.　　　R. H. BOWEN　　　1,900,222
GROOVED PULLEY
Filed Nov. 10, 1930
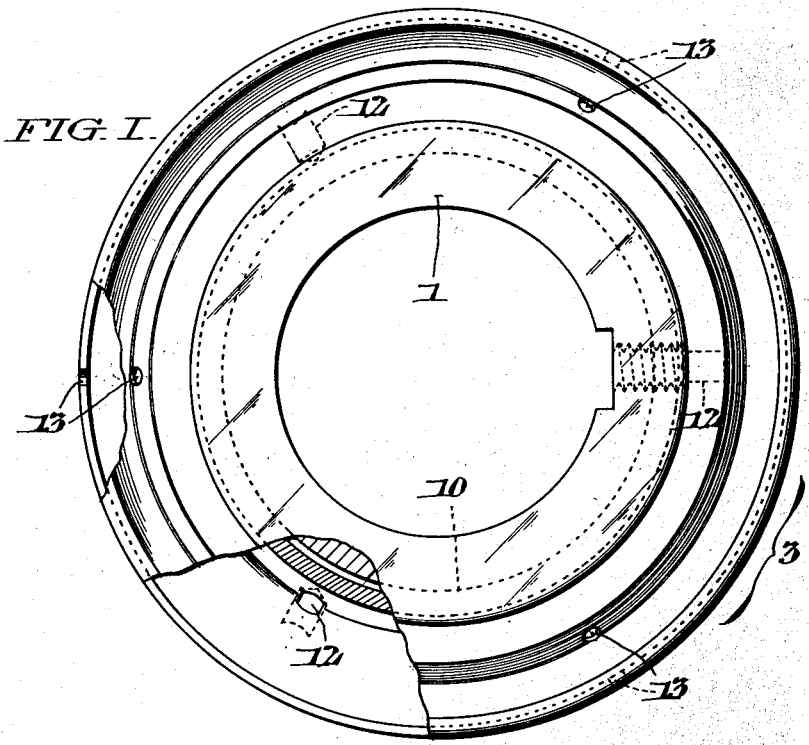
FIG. I.
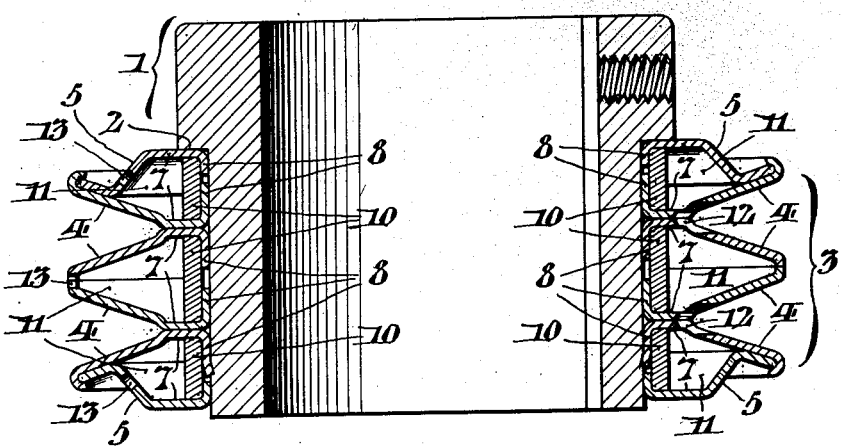
FIG. II.
WITNESSES
INVENTOR.
Russell H. Bowen,
BY
ATTORNEYS.

Patented Mar. 7, 1933

1,900,222

UNITED STATES PATENT OFFICE

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA

GROOVED PULLEY

Application filed November 10, 1930. Serial No. 494,639.

My invention relates to the construction of a grooved pulley, such as may be built up by the juxtaposition upon a hub of annular stamped metal disks secured thereto, each disk including an inclined portion which forms one wall of a groove. The inner edges of these annular disks are secured to the hub in any suitable manner and the grooves of the pulley are created by the juxtaposition of alternately reversed annular paired disks.

In such a pulley large enclosed air spaces are created between the walls which form the grooves. My invention has for its end to provide for a circulation of air within these spaces in order to reduce the temperature of the pulley when in use, it having been found that friction between such pulleys and their driving belt may sometimes heat the pulley to a sufficiently high temperature to be injurious to the belt.

In the accompanying drawing, I have illustrated my invention as applied to such a pulley, Fig. I being an end view with portions broken away to disclose important details of construction; and, Fig. II an axial sectional view of a pulley embodying this invention.

The hub 1 of the pulley is provided with a shoulder 2. The hub 1 is preferably hollow with capacity for splining upon a main shaft.

The perimeter of the pulley is built up by the paired juxtaposition upon the shaft of annular disks 3. Each disk 3 comprises an outer inclined surface 4 reaching to the perimeter of said disk and forming a wall of a groove, and each disk 3 is formed with a somewhat tubulate flange 8 on its inner edge. The portion of each disk 3 which connects the flange 8 with the inclined surface 4 may include a web 7.

By placing two of these annular disks 3 upon the hub 1 in alternately reversed position, a grooved pulley is created and by increasing the number of said disks similarly placed a multi-grooved perimeter is built up, each adjoining pair of inclined surfaces 4 forming a single groove.

Two adjacent disks may be secured to the hub by a single collar 10 having such dimensions that the flanges 8 of two of the disks 3 are clamped between it and the hub 1, one disk 3 passing around one edge and the other around the other edge of the collar 10. The parts are shaped to make this a driving fit so that the compression of the collar 10 firmly secures the disks 3 in place against both lateral strain and torque.

At each end of the series of annular disks 3 thus described I may place disks 5 differing in shape from the others but also formed with flanges 8 at their inner edge. These end disks 5 are shaped as shown so as to interlock at their outer perimeter with the over-turned outer edge of the nearest disk 3.

To build up the completed pulley the extreme disk 3 may be forced up against a shoulder 2, and succeeding disks 3 with their attachment collars 10 may be also forced close up against each other with production of the multi-grooved pulley which I have shown, in which the use of the stamped disks 3 lightens the pulleys and also provides an economical construction.

Such a pulley possesses large air spaces 11 between the walls of each pair of disks 3, and it is the design of my present invention to provide for the ventilation of these air spaces in order to lessen the possible heating of the pulley when in use due to friction between the belts which drive the pulley and the walls 4 of the grooves in which these belts are received. To this end I perforate the disks 3 with small apertures at different points. Thus in each disk I may provide a series of annularly arranged perforations or apertures 12 near the base of the inclined surface where it joins the web 7 of the disk 3. If two of these apertures on adjoining disks 3 to be caused to register, as shown on the drawing, the capacity of said apertures to admit air will be the greater. I also provide a series of apertures 13 at or near the peripheries of the disks 3. As shown each of two disks 3 has its edge recessed, and two of these recesses on adjoining disks combine to complete an aperture 13. But the apertures 13 may be put in different places.

In this way each air space 11 is provided with apertures, some 12 near its base, i. e., near to the hub 1 of the pulley, and some 13 near its apex, i. e. the perimeter of the disks 3.

In use, as the driving belt wraps itself around the pulley in its appropriate groove, the air near the bottom of the groove is, by the rotation of the pulley, forced into the first described apertures 13 leading to the air space 11 between the grooves, and the air which is thus forced into said space continually escapes from the other apertures 13 at or near the perimeter of the pulley being assisted in this by the centrifugal force created by rotation of the pulley. In this way a circulation of air is maintained and the temperature of the pulley maintained more nearly that of the surrounding atmosphere, thus overcoming a difficulty frequently experienced, namely, that friction between the driving belts and the pulley gradually raises the temperature of the pulley to a point which is deleterious to the pulley and to the belt which drives it.

Having thus described my invention, I claim:

1. A multi-grooved pulley provided with air spaces between the walls of the grooves, and said walls having apertures connecting with each air space both in the region of the bottom of the groove and in the region of the perimeter of the pulley, whereby a continuous circulation of fresh air through the respective spaces is effected assisted by the centrifugal force created incident to rotation of said pulley.

2. In a multi-grooved belt pulley comprising a hub with similar annular discs juxtaposed in alternately reversed position thereon to form air spaces between the walls of the grooves, and said walls having circumferentially spaced perforations therein some of which are located within and some without the region of belt contact to effect continuous circulation of fresh air through each air space during rotation of the pulley.

3. A multi-grooved pulley comprising a hub with annular discs juxtaposed in alternately reversed position thereon to form air spaces between the walls of the grooves, each said disc embodying an outer inclined groove wall and an inner hub-contacting flange, and each groove wall having circumferentially spaced perforations therein at different radial locations to effect continuous circulation of fresh air through each air space during rotation of the pulley.

4. A multi-grooved pulley comprising a hub with annular discs juxtaposed in alternately reversed position thereon to form air spaces between the walls of the grooves, each said disc embodying an outer inclined groove wall and an inner hub-contacting tubular flange with an intervening straight web portion, and said groove walls having circumferentially spaced perforations connecting into each air space both in the region of the bottom of the groove and in the region of its peripheral edge, whereby a continuous circulation of fresh air can be maintained through each air space assisted by centrifugal force created during rotation of the pulley.

5. A multi-grooved pulley comprising a hub with annular discs juxtaposed in alternately reversed position thereon to provide air spaces between the walls of the grooves, each said disc embodying an outer inclined groove wall and an inner hub-contacting tubular flange, said groove walls having circumferentially spaced perforations connecting into each air space at the bottom of the groove and in the peripheral edge thereof to effect continuous circulation of fresh air through the respective air spaces during rotation of the pulley, and each said perforation being formed by opposed recessions in the outer edges and at adjoining inner portions of the inclined groove walls when two of the discs are juxtapositioned as aforesaid.

6. A multi-grooved pulley comprising a hub with annular discs juxtaposed in alternately reversed position thereon to provide air spaces between the walls of the grooves, each said disc embodying an outer inclined groove wall and an inner hub-contacting tubular flange with an intervening straight web portion, said groove walls having circumferentially spaced perforations connecting into each air space at the bottom of the groove and in the peripheral edge thereof to effect continuous circulation of fresh air through the respective air spaces during rotation of the pulley, each said perforation being formed by opposed recessions in the outer edges and at inner portions of the inclined groove walls adjoining the straight web portions when two of the discs are juxtapositioned as aforesaid, and the perforations at the bottoms of the respective grooves being of greater air admitting capacity than those at the peripheral edges of said grooves.

In testimony whereof, I have hereunto signed my name at Philadelphia, Pennsylvania, this 6th day of November 1930.

RUSSELL H. BOWEN.